United States Patent
Davis et al.

(10) Patent No.: US 6,972,776 B2
(45) Date of Patent: Dec. 6, 2005

(54) SCROLLING METHOD USING SCREEN POINTING DEVICE

(75) Inventors: Jeffery Davis, Mountain View, CA (US); Michael John Brosnan, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 620 days.

(21) Appl. No.: 09/812,754

(22) Filed: Mar. 20, 2001

(65) Prior Publication Data

US 2002/0135602 A1 Sep. 26, 2002

(51) Int. Cl.[7] ............................................. G09G 5/00
(52) U.S. Cl. ...................................................... 345/684
(58) Field of Search ........................ 345/684, 784–786, 345/787

(56) References Cited

U.S. PATENT DOCUMENTS

| | | | | |
|---|---|---|---|---|
| 5,495,566 A | * | 2/1996 | Kwatinetz | 345/785 |
| 5,506,951 A | * | 4/1996 | Ishikawa | 345/786 |
| 5,510,808 A | * | 4/1996 | Cina et al. | 345/684 |
| 5,568,603 A | * | 10/1996 | Chen et al. | 345/784 |
| 5,726,687 A | * | 3/1998 | Belfiore et al. | 345/785 |
| 5,805,161 A | * | 9/1998 | Tiphane | 345/786 |
| 6,057,840 A | * | 5/2000 | Durrani et al. | 345/786 |
| 6,069,626 A | * | 5/2000 | Cline et al. | 345/786 |
| 6,154,194 A | * | 11/2000 | Singh | 345/661 |
| 6,208,343 B1 | * | 3/2001 | Roth | 345/786 |
| 6,313,849 B1 | * | 11/2001 | Takase et al. | 345/684 |
| 6,331,863 B1 | * | 12/2001 | Meier et al. | 345/684 |
| 6,337,694 B1 | * | 1/2002 | Becker et al. | 345/684 |
| 6,384,845 B1 | * | 5/2002 | Takaike | 345/786 |
| 6,570,594 B1 | * | 5/2003 | Wagner | 345/786 |

OTHER PUBLICATIONS

Vince Lee, TEx Tennison, and Amanda Epume; TealDoc User's Manual, Program Version 3.03; Nov. 15, 1999.
Adobe Systems Incorporated; Adobe Acrobat Reader 4.0 Guide; 1999.
LandWare, Inc.; TakeNote! DOC and Memo Text Processor for Palm Connected Organizers; 2000.

* cited by examiner

*Primary Examiner*—Sumati Lefkowitz
*Assistant Examiner*—Motilewa Good-Johnson

(57) ABSTRACT

A method of scrolling through information displayed on a display screen of an electronic device includes providing a first plurality of user selectable scrolling zones on the display screen. Each scrolling zone in the first plurality of scrolling zones is associated with a scrolling technique. The display screen includes a screen pointer controllable by a user with a screen pointing device. Zone selection information identifying a first one of the scrolling zones selected by a user with the screen pointing device is received. The displayed information is scrolled through based on the scrolling technique associated with the selected scrolling zone.

23 Claims, 4 Drawing Sheets

SCROLLING METHOD USING SCREEN POINTING DEVICE

THE FIELD OF THE INVENTION

This invention relates generally to devices for controlling a cursor on a display screen, also known as screen pointing devices. This invention relates more particularly to methods for scrolling through information displayed on a display screen using a screen pointing device.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface of the mouse slide easily over the fabric, but the rubber ball does not skid. Rather, the rubber ball rolls over the fabric as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse. The user moves the mouse as necessary to get the displayed pointer to a desired location or position. Once the pointer on the screen points at an object or location of interest, a button on the mouse is activated with the fingers of the hand holding the mouse. The activation serves as an instruction to take some action, the nature of which is defined by software in the computer.

In addition to a mouse, other types of screen pointing devices are available, including trackballs, optical pointing devices, joysticks, arrow buttons and keys, and others. One action that may be taken using a screen pointing device is to scroll through information displayed on a display screen. Typically, scrolling is performed by moving the screen pointer to a scroll bar that is displayed on the display screen, and clicking on the scroll bar. Scroll bars may be provided for both horizontal and vertical scrolling. Other scrolling techniques have also been used, including the automatic scrolling that occurs in Microsoft Word, when a portion of text is selected and then dragged past a boundary of a displayed window. Similarly, in Adobe Acrobat Reader, a user may double-click on a displayed page, and drag the page up or down. Some software programs for Palm personal digital assistants (PDAs), including TealDoc by TealPoint Software and TakeNote! by LandWare, allow a user to scroll up/down through documents by pressing the stylus against the screen. A document may be scrolled upward by pressing a stylus near the top of the displayed document. A document may be scrolled downward by pressing the stylus near the bottom of the displayed document.

There exists a need for new scrolling techniques that allow a user to use a screen pointing device to quickly and efficiently navigate through displayed information.

SUMMARY OF THE INVENTION

One form of the present invention provides a method of scrolling through information displayed on a display screen of an electronic device. A first plurality of user selectable scrolling zones is provided on the display screen. Each scrolling zone in the first plurality of scrolling zones is associated with a scrolling technique. The display screen includes a screen pointer controllable by a user with a screen pointing device. Zone selection information identifying a first one of the scrolling zones selected by a user with the screen pointing device is received. The displayed information is scrolled through based on the scrolling technique associated with the selected scrolling zone.

Another form of the present invention provides an electronic device including a display screen for displaying information. The display screen includes a screen pointer controllable by a user with a screen pointing device. The display screen includes a first plurality of user selectable scrolling zones. Each scrolling zone in the first plurality of scrolling zones is associated with a scrolling technique. A controller receives zone selection information identifying a first one of the scrolling zones selected by a user with the screen pointing device. The controller is configured to cause information displayed on the display screen to scroll based on the scrolling technique associated with the selected scrolling zone.

Another form of the present invention provides a method of scrolling through information displayed on a display screen of an electronic device. The display screen includes a screen pointer controllable by a user with a screen pointing device. Mode selection information is received from a user. The mode selection information indicates that a user has selected a scroll mode. Movement information provided by a user with the screen pointing device is received. A first movement direction and a first movement velocity are determined based on the received movement information. The screen pointer is moved based on the received movement information. The displayed information on the display screen is scrolled in a direction corresponding to the first movement direction and in an amount based on the first movement velocity. The scrolling amount is greater than the amount of movement of the screen pointer.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
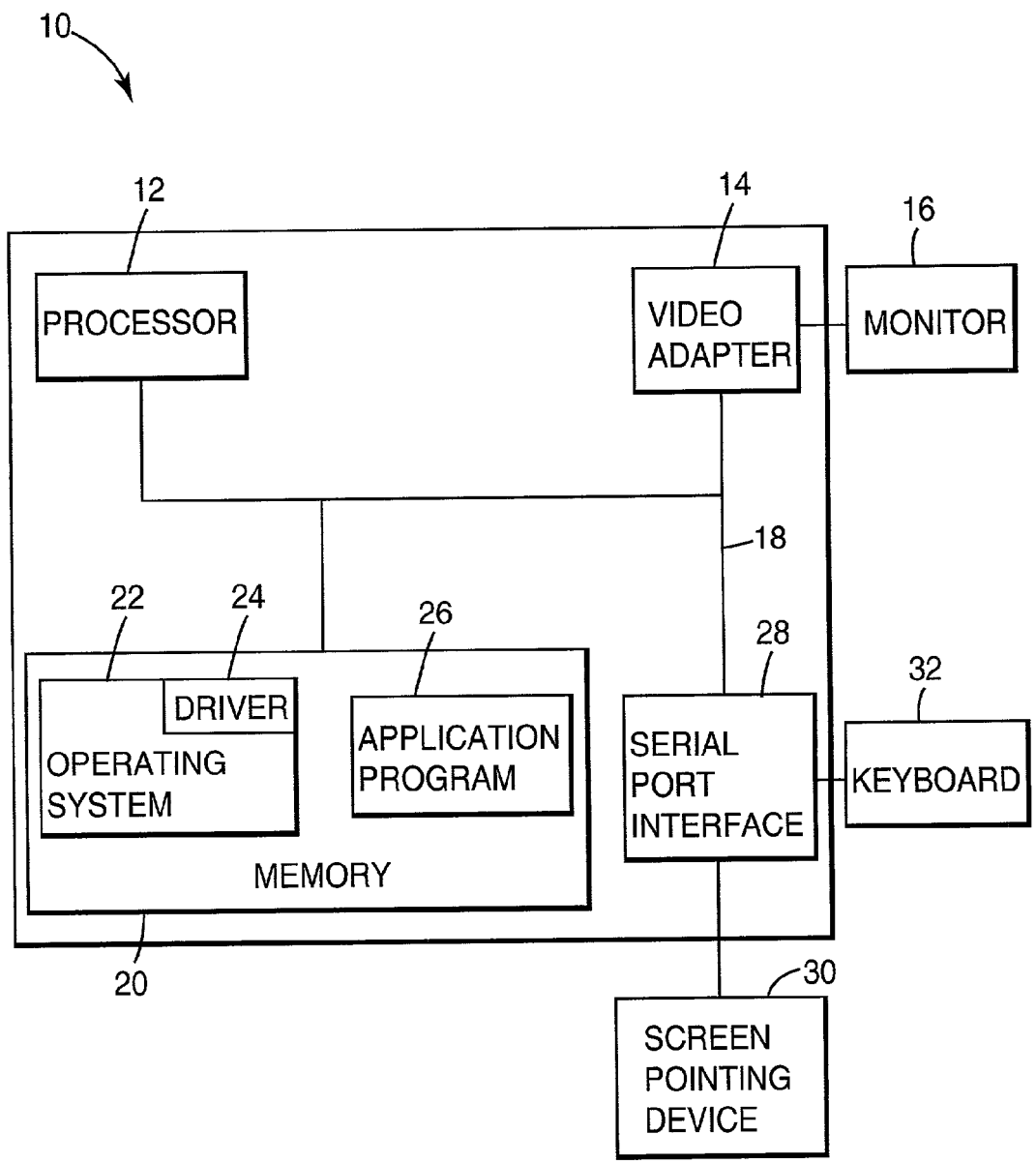
FIG. 1 is an electrical block diagram illustrating major components of a typical computer system, which may be used to implement embodiments of the present invention.

FIG. 1 is an electrical block diagram illustrating major components of a typical computer system, which may be used to implement embodiments of the present invention. Computer system 10 includes processor 12, video adapter 14, monitor 16, system bus 18, memory 20, serial port interface 28, screen pointing device 30, and keyboard 32. In one embodiment, screen pointing device 30 is a mouse. In another embodiment, an alternative pointing device is used, such as a track ball, optical pointing device, stylus, or other pointing device.

Processor 12 communicates with various components of computer system 10, including video adapter 14, serial port interface 28, and memory 20, via system bus 18. Video adapter 14 is coupled to monitor 16, and drives monitor 16 under the control of processor 12. Monitor 16 may be any type of display device, including a flat panel display, a touch screen display, or other display device. Mouse 30 is coupled to computer system 10 via serial port interface 28. Motion data received from mouse 30 is passed from serial port interface 28 to processor 12 for processing. Memory 20 includes operating system 22 and one or more application programs 26. Operating system 22 includes mouse driver 24, which is used by processor 12 in processing motion data received by mouse 30.

Although the present invention is described in the context of a computer system, the techniques described herein are applicable to any type of electronic device with a display screen and a movable screen pointer, including, but not limited to, a cellular telephone, personal digital assistant (PDA), portable music player (e.g., MP3 player), pager, portable game device, or other device.

Mouse 30 generates electrical signals indicative of movement of mouse 30 against a work surface, such as a mouse pad. The electrical signals generated by mouse 30 are provided through serial port interface 28 to processor 12. Processor 12 responds to the signals received from mouse 30 to change by a $\Delta X$ and a $\Delta Y$ the displayed position of a pointer (cursor) on monitor 16. A user moves mouse 30 as necessary to get the displayed pointer to a desired location or position on monitor 16. Once the pointer on the screen points at an object or location of interest, a button on mouse 30 is activated with the fingers of the hand holding mouse 30. The activation serves as an instruction to processor 12 to take some action, the nature of which is defined by software stored in memory 20, such as driver 24 or application program 26. Processor 12 monitors the current position of the screen pointer displayed on monitor 16 to take appropriate action based on the position of the screen pointer when a user activates a mouse button. In one embodiment, activation of a button on mouse 30 causes computer 10 to enter into a scrolling mode.

It will be understood by a person of ordinary skill in the art that functions performed by computer system 10 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Monitor 16 includes a display screen for displaying text, graphics, or other information. In one embodiment, mouse 30 is used to scroll through information displayed on the display screen. FIGS. 2A, 2B, 3A, and 3B, illustrate embodiments of display screens displayed on monitor 16 according to the present invention.

Figure 2A:
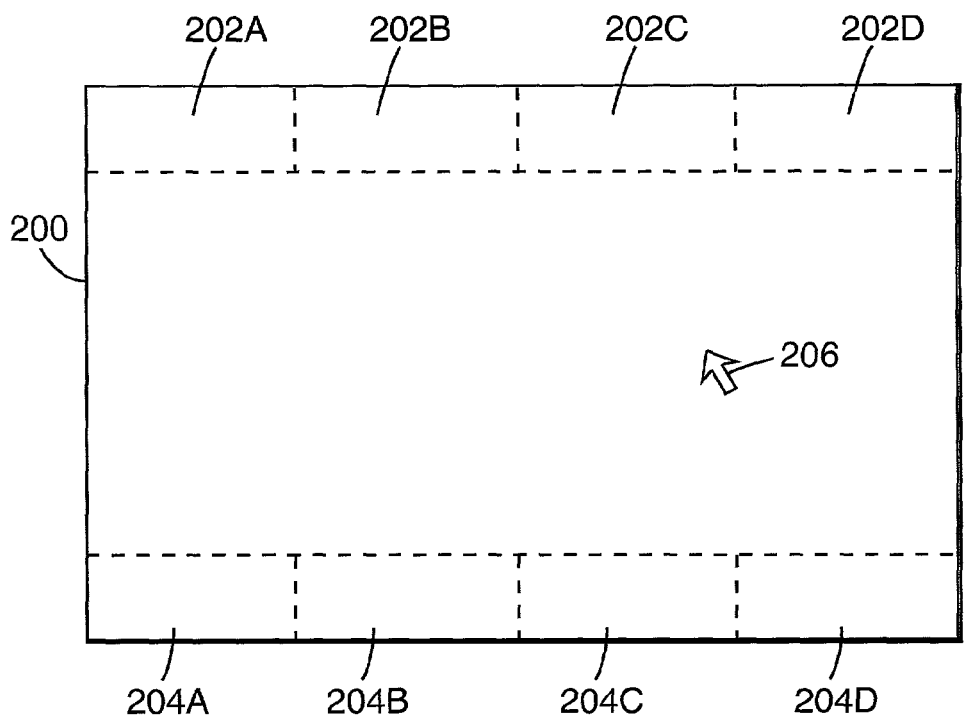
FIG. 2A is a diagram of a display screen illustrating one embodiment of a scrolling method according to the present invention.

FIG. 2A is a diagram of a display screen illustrating one embodiment of a scrolling method according to the present invention. Display screen 200 includes a first plurality of scrolling zones 202A–202D (collectively referred to as scrolling zones 202), a second plurality of scrolling zones 204A–204D (collectively referred to as scrolling zones 204), and a screen pointer 206. In one embodiment, scrolling zones 202 and 204 are not displayed on display screen 200, and are therefore represented in FIG. 2A by dashed lines. In an alternative embodiment (shown in FIG. 2B), the scrolling zones are displayed on the display screen.

In one embodiment, each one of the scrolling zones in scrolling zones 202 and 204 corresponds to a scrolling technique. In one form of the present invention, the scrolling technique corresponding to a scrolling zone defines a scrolling granularity, such as line scrolling, paragraph scrolling, page scrolling, or document scrolling. In another form of the present invention, the scrolling technique corresponding to a scrolling zone defines a scrolling speed, such as slow, medium slow, medium fast, and fast. Although four scrolling zones are shown for each of scrolling zones 202 and 204 in FIG. 2A, other numbers of scrolling zones are used in alternative embodiments.

A user moves screen pointer 206 around display screen 200 using mouse 30. In one embodiment, a user selects one of the scrolling zones in scrolling zones 202 and 204, by positioning screen pointer 206 over the desired scrolling zone, and activating a button on mouse 30. The activation may be a single-click of a mouse button, a double-click, or some other activation indication. Processor 12 identifies the scrolling zone selected by the user based on the position of screen pointer 206 when the user activates the mouse button. Based on the selected scrolling zone, processor 12 causes the information displayed on display screen 200 to scroll, using the scrolling technique corresponding to the selected scrolling zone.

In one embodiment, scrolling zone 202A corresponds to upward line scrolling, scrolling zone 202B corresponds to upward paragraph scrolling, scrolling zone 202C corresponds to upward page scrolling, and scrolling zone 202D corresponds to upward document scrolling. Similarly, in one embodiment, scrolling zone 204A corresponds to downward line scrolling, scrolling zone 204B corresponds to downward paragraph scrolling, scrolling zone 204C corresponds to downward page scrolling, and scrolling zone 204D corresponds to downward document scrolling.

Each time a user selects scrolling zone 202A, processor 12 causes the information displayed on display screen 200 to scroll up one line. Likewise, each time a user selects scrolling zone 202B, 202C, or 202D, processor 12 causes the information displayed on display screen 200 to scroll up one paragraph, up one page, and scroll up to the top of the file, respectively. Similarly, each time a user selects scrolling zone 204A, 204B, 204C, or 204D, processor 12 causes the information displayed on display screen 200 to scroll down one line, down one paragraph, down one page, and scroll down to the bottom of the file, respectively. Scrolling granularities other than the four described above are used in alternative embodiments.

In an embodiment where scrolling zones 202 and 204 correspond to scrolling speeds, processor 12 causes the information displayed on display screen 200 to scroll based on a direction and scrolling speed corresponding to a selected scrolling zone. The scrolling may occur a line at a time, two lines at a time, a paragraph at a time, or other suitable granularity. Scrolling continues as long as a user continues to select a particular scrolling zone, or until a boundary in a document is reached.

In one form of the present invention, rather than positioning scrolling zones 202 and 204 adjacent a top portion, and a bottom portion, respectively, of display screen 200, scrolling zones 202 and 204 are positioned adjacent a left portion and a right portion, respectively, of display screen 200, to provide leftward and rightward scrolling. In another form of the present invention, four sets of scrolling zones are provided, one set near a top, bottom, left, and right portion of display screen 200, to provide scrolling in four directions. Other numbers of scrolling zones and positioning may be used based on the desired implementation, including scrolling zones that provide diagonal scrolling.

Figure 2B:
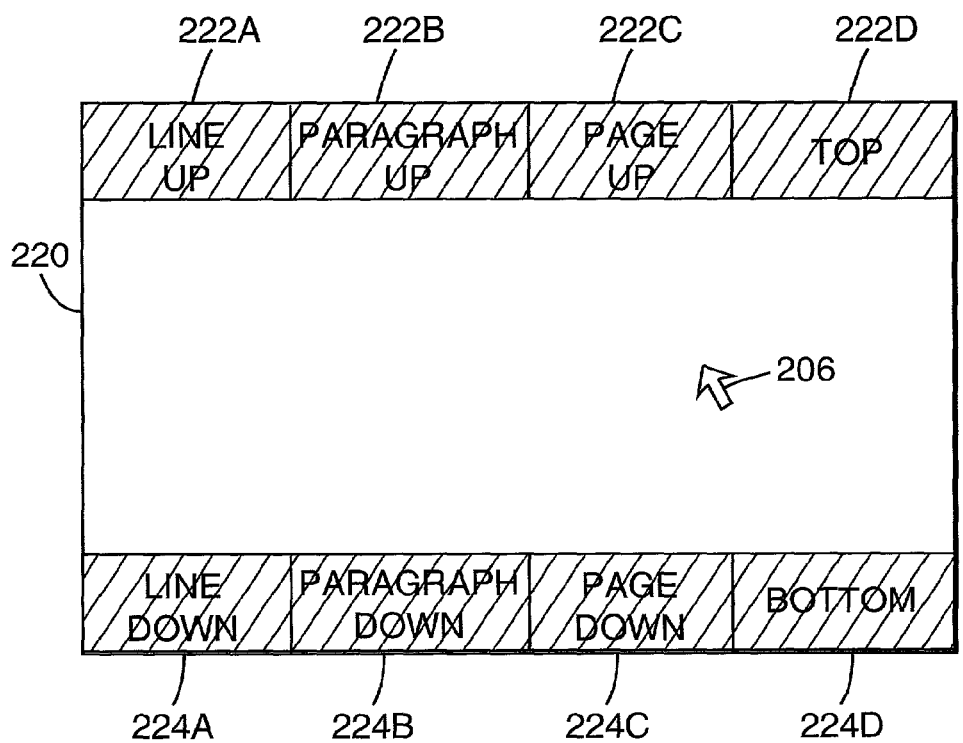
FIG. 2B is a diagram of an alternative embodiment of the display screen shown in FIG. 2A.

FIG. 2B is a diagram of an alternative embodiment of the display screen shown in FIG. 2A. Display screen 220 includes a first plurality of scrolling zones 222A–222D (collectively referred to as scrolling zones 222), a second plurality of scrolling zones 224A–224D (collectively referred to as scrolling zones 224), and a screen pointer 206. Display screen 220 is substantially similar to display screen 200, but scrolling zones 222 and 224 are explicitly displayed on screen 220, as opposed to being implicitly present but not displayed as in display screen 200. Scrolling zones 222 and 224 operate in the same manner as scrolling zones 202 and 204.

In FIG. 2B, each one of the scrolling zones in scrolling zones 222 and 224 is represented by a shaded rectangle indicating the boundaries of the scrolling zone, with text within the rectangle indicating a scrolling technique associated with the scrolling zone. In one embodiment, alternative representations of scrolling zones 222 and 224 are used, such as shaded or colored rectangles or other shapes with no text, text only with no boundary indicators, and graphical icons. It will be understood by a person of ordinary skill in the art that any suitable representations of scrolling zones 222 and 224 may be displayed.

As shown in FIG. 2B, scrolling zone 222A corresponds to upward line scrolling. And scrolling zones 222B, 222C, and 222D, correspond to upward paragraph scrolling, page scrolling, and document scrolling, respectively. Similarly, scrolling zones 224A, 224B, 224C, and 224D, correspond to downward line scrolling, paragraph scrolling, page scrolling, and document scrolling, respectively. Alternative or additional scrolling granularities may be used.

In an embodiment where scrolling zones 222 and 224 correspond to scrolling speeds, an indicator may be provided in each one of scrolling zones 222 and 224 to indicate a scrolling speed corresponding to the scrolling zone. In one embodiment, scrolling zones 222A–222D include the text "slow," "medium slow," "medium fast," and "fast," respectively. Likewise, scrolling zones 224A–224D also include the text "slow," "medium slow," "medium fast," and "fast," respectively. In an alternative embodiment, scrolling zones 222 and 224 include arrows with increasing size to indicate increasing scrolling speed. It will be understood that other text or indicators may be used to indicate scrolling speed, and that other numbers of scrolling speeds may be provided, rather than four. Processor 12 causes the information displayed on display screen 220 to scroll based on a direction and scrolling speed corresponding to a selected scrolling zone. The scrolling may occur a line at a time, two lines at a time, a paragraph at a time, or other suitable granularity. Scrolling continues as long as a user continues to select a particular scrolling zone, or until a boundary in a document is reached.

Figure 3A:
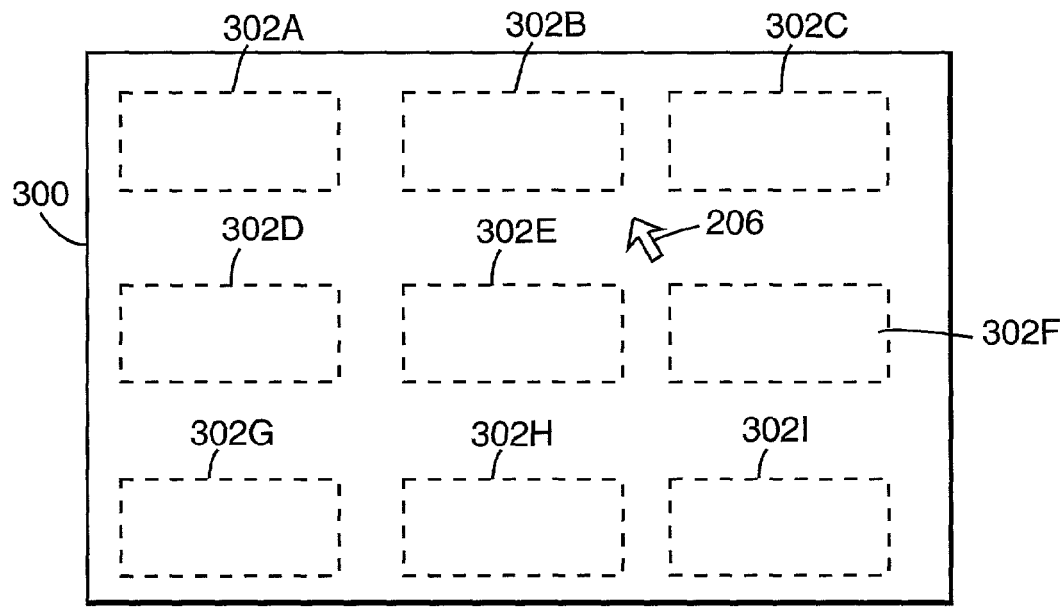
FIG. 3A is a diagram of a display screen illustrating another embodiment of a scrolling method according to the present invention.

FIG. 3A is a diagram of a display screen illustrating another embodiment of a scrolling method according to the present invention. Display screen 300 includes a plurality of scrolling zones 302A–302I (collectively referred to as scrolling zones 302), and a screen pointer 206. In one embodiment, scrolling zones 302 are not displayed on display screen 300, and are therefore represented in FIG. 3A by dashed lines. In an alternative embodiment (shown in FIG. 3B), the scrolling zones are displayed on the display screen.

In one embodiment, each one of the scrolling zones 302 corresponds to a scrolling technique. In one form of the present invention, the scrolling technique corresponding to a scrolling zone defines a scrolling granularity, such as line scrolling, half-page scrolling, and page scrolling. In another form of the present invention, the scrolling technique corresponding to a scrolling zone defines a scrolling speed, such as slow, medium, and fast. In another form of the present invention, one or more of scrolling zones 302 correspond to a non-scrolling action that is taken by computer system 10. For example, in the embodiment shown in FIG. 3A, scrolling zone 302E corresponds to a "Document Jump" action. When a user selects scrolling zone 302E, processor 12 causes a different document to be displayed on display screen 300.

Other non-scrolling actions are associated with particular ones of scrolling zones 302 in alternative embodiments. For example, one of scrolling zones 302 may be used to jump to highlighted hypertext, or jump to an address book or other application. In one embodiment, the actions associated with one or more of scrolling zones 302 vary depending upon what is currently being viewed on display screen 300. In one form of the invention, the actions associated with scrolling zones 302A–302C and 302G–302I remain static, while the actions associated with scrolling zones 302D–302F vary depending upon the content currently being displayed. For example, assuming that an email message is displayed on display screen 300, scrolling zone 302E could correspond to a "jump to highlighted hypertext" action while the user is scrolling through the email message, and then change to a "jump to next email" action when the user reaches the end of the email message. By associating scrolling and non-scrolling actions with scrolling zones 302, a user may smartly interact with the page in view. Although nine scrolling zones 302 are shown in FIG. 3A, other numbers of scrolling zones 302 are used in alternative embodiments.

A user moves screen pointer 206 around display screen 300 using mouse 30. In one embodiment, a user selects one of the scrolling zones 302 by positioning screen pointer 206 over the desired scrolling zone, and activating a button on mouse 30. The activation may be a single-click of a mouse button, a double-click, or some other activation indication. Processor 12 identifies the scrolling zone selected by the user based on the position of screen pointer 206 when the user activates the mouse button. Based on the selected scrolling zone 302, processor 12 causes the information displayed on display screen 200 to scroll, using the scrolling technique corresponding to the selected scrolling zone 302.

In one embodiment, scrolling zone 302A corresponds to upward line scrolling, scrolling zone 302B corresponds to upward half-page scrolling, scrolling zone 302C corresponds to upward page scrolling, scrolling zone 302D corresponds to leftward half-page scrolling, scrolling zone 302E corresponds to a document jump action, scrolling zone 302F corresponds to rightward half-page scrolling, scrolling zone 302G corresponds to downward line scrolling, scrolling zone 302H corresponds to downward half-page scrolling, and scrolling zone 302I corresponds to downward page scrolling. Each time a user selects one of scrolling zones 302, processor 12 causes the information displayed on display screen 300 to scroll in the direction and granularity corresponding to the selected scrolling zone 302. Scrolling granularities other than the three described above are used in alternative embodiments.

In an embodiment where scrolling zones 302 correspond to scrolling speeds, processor 12 causes the information displayed on display screen 300 to scroll based on a direction and a scrolling speed corresponding to a selected scrolling zone. The scrolling may occur a line at a time, two lines at a time, a paragraph at a time, or other suitable granularity. Scrolling continues as long as a user continues to select a particular scrolling zone, or until a boundary in a document is reached.

Figure 3B:
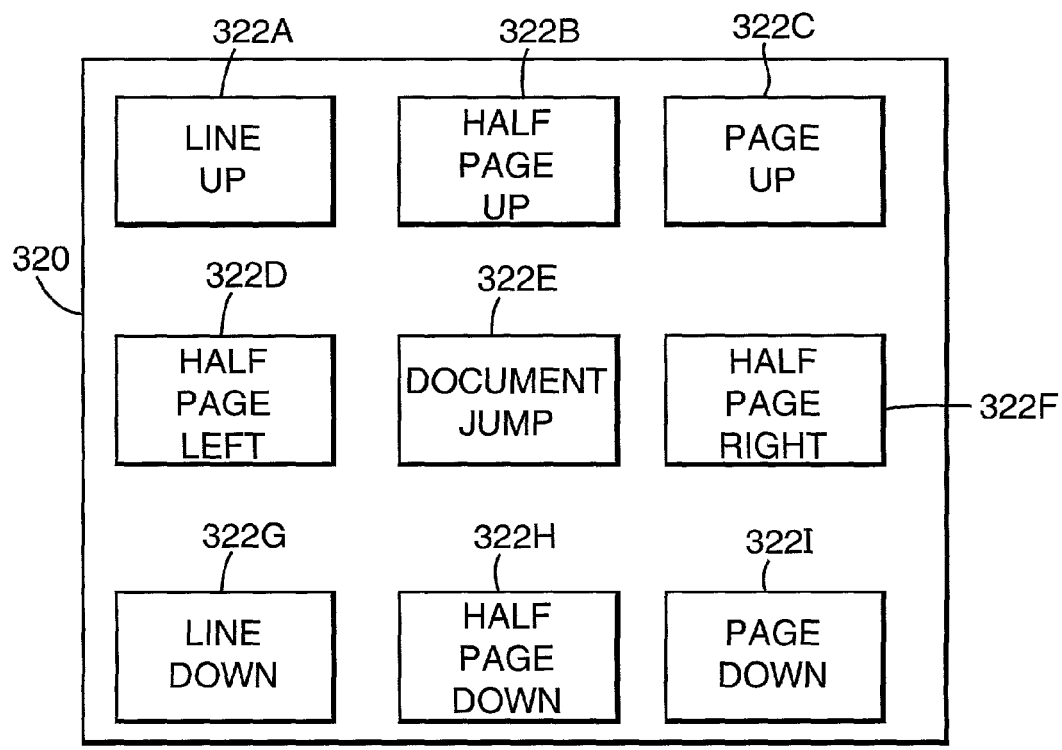
FIG. 3B is a diagram of an alternative embodiment of the display screen shown in FIG. 3A.

FIG. 3B is a diagram of an alternative embodiment of the display screen shown in FIG. 3A. Display screen 320 includes a plurality of scrolling zones 322A–322I (collectively referred to as scrolling zones 322), and a screen pointer 206. Display screen 320 is substantially similar to display screen 300, but scrolling zones 322 are explicitly displayed on screen 320, as opposed to being implicitly present but not displayed as in display screen 300. Scrolling zones 322 operate in the same manner as scrolling zones 302.

In FIG. 3B, each one of the scrolling zones 322 is represented by a square indicating the boundaries of the scrolling zone, with text within the square indicating a scrolling technique associated with the scrolling zone. In one embodiment, alternative representations of scrolling zones 322 are used, such as shaded or colored squares or other shapes with no text, text only with no boundary indicators, and graphical icons. It will be understood by a person of ordinary skill in the art that any suitable representations of scrolling zones 322 may be displayed. In one form of the present invention, one or more of scrolling zones 322, such as scrolling zone 322E, are associated with non-scrolling actions. In one embodiment, the displayed representations of scrolling zones 322 vary depending upon what is currently being displayed on display screen 320.

In an embodiment where scrolling zones 322 correspond to scrolling speeds, an indicator may be provided in each one of scrolling zones 322 to indicate a scrolling speed corresponding to the scrolling zone. In one embodiment, scrolling zones 322 include descriptive text indicating a scrolling speed, such as "slow," "medium," and "fast," along with text indicating a scrolling direction, such as "left," "right," "up," and "down." In an alternative embodiment, scrolling zones 322 include arrows with increasing size to indicate increasing scrolling speed, with the arrows pointing in a corresponding scrolling direction. It will be understood that other text or indicators may be used to indicate scrolling speed, and that any number of scrolling speeds may be provided. Processor 12 causes the information displayed on display screen 320 to scroll based on a scrolling speed and direction corresponding to a selected scrolling zone 322. The scrolling may occur a line at a time, two lines at a time, a paragraph at a time, or other suitable granularity. Scrolling continues as long as a user continues to select a particular scrolling zone, or until a boundary in a document is reached.

In one embodiment, processor 12 senses when the position of screen pointer 206 is close to one of scrolling zones 322, and causes screen pointer 206 to "snap to" that particular scrolling zone. Thus, a user need only move screen pointer 206 close to a desired scrolling zone 322, and screen pointer 206 is automatically positioned over that scrolling zone. By providing this "snap to" functionality, accuracy of placement of screen pointer 206 is not critical, and a user can select scrolling techniques more efficiently, and quickly scroll through displayed information as desired.

It will be understood that display screens 200, 220, 300, and 320, need not cover the entire display area of monitor 16, but may cover only a subset of the display area, such as a window displayed on a portion of the display area. In one form of the present invention, the scrolling techniques corresponding to scrolling zones, including scrolling speeds and scrolling granularities, are user definable.

Figure 4:
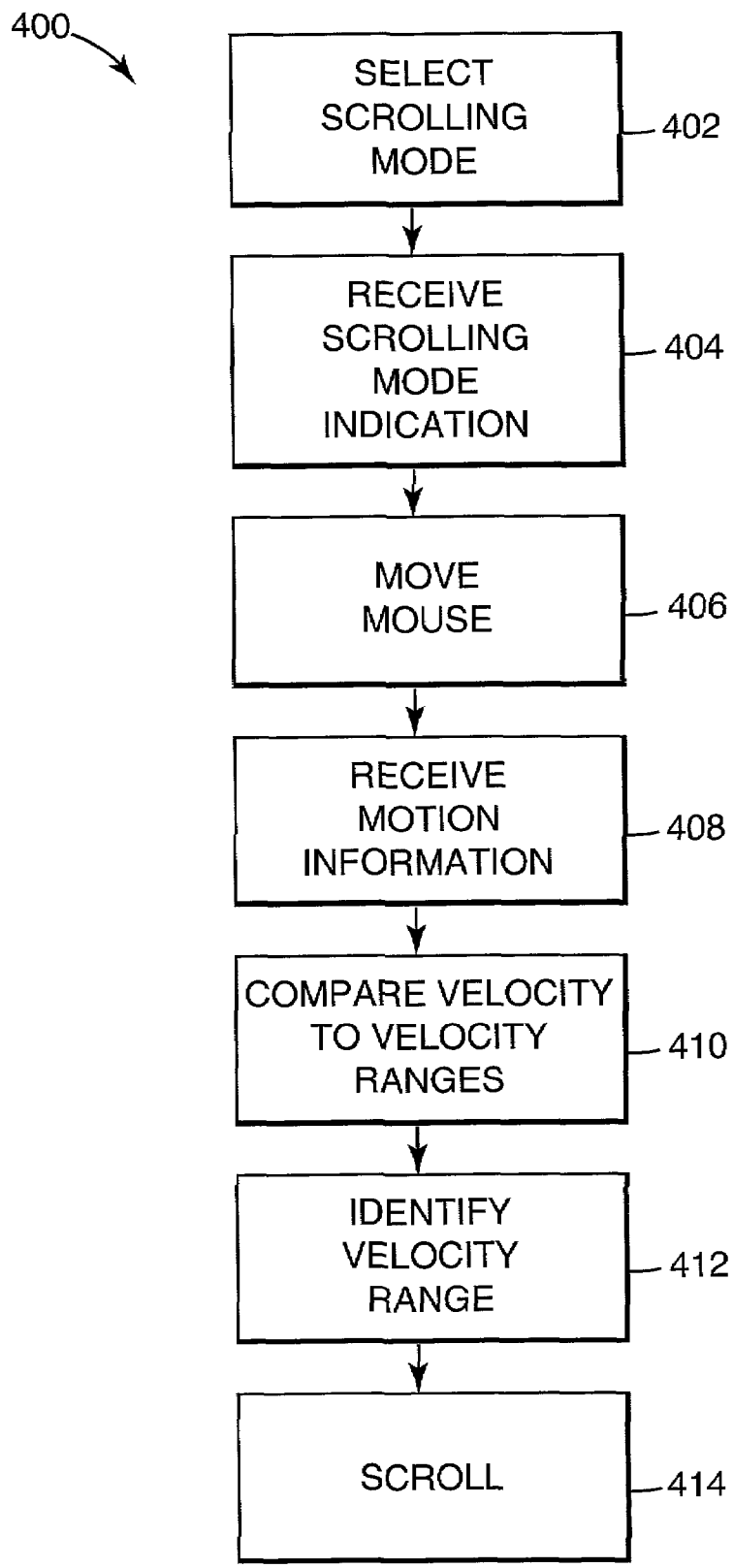
FIG. 4 is a flow diagram illustrating another embodiment of a scrolling method according to the present invention.

In one form of the present invention, processor 12 causes scrolling of information on a display screen, such as display screen 200, 220, 300, or 320, in an amount corresponding to a velocity of movement of mouse 30. FIG. 4 is a flow diagram illustrating one embodiment of a process 400 for scrolling based on velocity of a movement of a pointing device, such as mouse 30.

In step 402, a user selects scrolling mode. In one embodiment, the scrolling mode is selected by pressing and holding a button on mouse 30. In step 404, processor 12 receives a signal from mouse 30 indicating that the user is pressing and holding a button on mouse 30, indicating that the scrolling mode has been selected.

In step 406, while in scrolling mode, a user moves mouse 30 in a direction corresponding to a desired direction that the user wants to scroll, and with a speed corresponding to an amount that the user wants to scroll. In step 408, processor 12 receives motion information from mouse 30, indicating direction and velocity of movement of mouse 30.

In step 410, processor 12 compares the velocity of movement of mouse 30 with a plurality of velocity ranges. Each velocity range corresponds to a scrolling amount (e.g., one line, one paragraph, one page, five pages, etc.), with increasing velocity ranges corresponding to larger scrolling amounts. In step 412, processor 12 identifies the velocity range that the current velocity of mouse 30 falls within. In step 414, processor 12 causes the displayed information to scroll an amount corresponding to the identified velocity range. For example, relatively small velocities correspond to scrolling a few lines, and relatively large velocities correspond to scrolling several pages or an entire document.

The scrolling method described above with reference to FIG. 4 differs from scrolling methods like that used by Adobe Acrobat Reader. In Adobe Acrobat Reader, a user can double click on a displayed document, and cause the document to scroll by moving the screen pointer. The document scrolls in an amount corresponding to the amount of movement of the screen pointer. In contrast, in one embodiment of the scrolling method of the present invention, documents and other files can be scrolled beyond the amount of movement of the screen pointer. The amount of scrolling is based on the velocity of movement of the screen pointer in one form of the invention. Relatively small and quick mouse movements can be used to scroll through large quantities of displayed information. A single "flick" of the mouse, can cause scrolling through multiple pages of information.

In one embodiment, scrolling is based on the sensed velocity of mouse 30 when the displayed pointer 206 reaches a screen boundary, such as a boundary of a displayed window, or a boundary of the display area on monitor 16. A scrolling direction is determined based on the particular screen boundary reached. For example, if pointer 206 is moved to a top screen boundary, the displayed information scrolls upward in an amount based on the sensed velocity of mouse 30 when the top screen boundary is reached. In one embodiment, such scrolling occurs only when a user selects a scrolling mode, such as by activating and holding a button on mouse 30. In one form of the present invention, acceleration of mouse 30 is used by processor 12 in determining an amount to scroll. Either velocity or acceleration, or both, of either the screen pointer itself, or of the pointing device used to move the screen pointer, can by used by processor 12 to identify a scrolling distance or a destination to scroll to.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of scrolling through information displayed on a display screen of an electronic device, the display screen including a screen pointer controllable by a user with a screen pointing device, the method comprising:
   providing a first plurality of user selectable scrolling zones on the display screen, each scrolling zone in the first plurality of scrolling zones associated with a scrolling technique and corresponding to scrolling in a first direction, each of the scrolling zones in the first plurality being positioned substantially adjacent to a first edge of the display screen;
   providing a second plurality of user selectable scrolling zones on the display screen, each scrolling zone in the second plurality of scrolling zones associated with a scrolling technique and corresponding to scrolling in a second direction that is different from the first direction, each of the scrolling zones in the second plurality of being positioned substantially adjacent to a second edge of the display screen, wherein the first edge is opposite to the second edge;
   receiving zone selection information identifying a first one of the scrolling zones selected by a user with the screen pointing device; and
   scrolling through the displayed information based on the scrolling technique associated with the selected scrolling zone.

2. The method of claim 1, wherein the scrolling techniques associated with the scrolling zones in the first plurality correspond to different scrolling speeds.

3. The method of claim 1, wherein the scrolling techniques associated with the scrolling zones in the first plurality correspond to different scrolling granulanties.

4. The method of claim 3, wherein the scrolling granularities include line scrolling, paragraph scrolling, and page scrolling.

5. The method of claim 1, wherein the first plurality of scrolling zones is positioned substantially adjacent to a top of the display screen and corresponds to upward scrolling, and wherein the second plurality of scrolling zones is positioned substantially adjacent to a bottom of the display screen and corresponds to downward scrolling.

6. The method of claim 1, wherein the first plurality of scrolling zones is positioned substantially adjacent to a left edge of the display screen and corresponds to leftward scrolling, and wherein the second plurality of scrolling zones is positioned substantially adjacent to a right edge of the display screen and corresponds to rightward scrolling.

7. The method of claim 1, and further comprising:
   providing a third and a fourth plurality of user selectable scrolling zones on the display screen, each scrolling zone in the third plurality of scrolling zones associated with a scrolling technique and corresponding to scrolling in a third direction that is different from the first and the second directions, each scrolling zone in the fourth plurality of scrolling zones associated with a scrolling technique and corresponding to scrolling in a fourth direction that is different from the first, second, and third directions.

8. The method of claim 1, and further comprising:
   displaying a first plurality of zone representations on the display screen representing the first plurality of user selectable scrolling zones.

9. The method of claim 8, wherein each of the zone representations indicates a scrolling technique.

10. The method of claim 8, wherein each of the zone representations indicates a boundary of a user selectable scrolling zone.

11. The method of claim 1, wherein the scrolling techniques associated with the scrolling zones are user definable.

12. The method of claim 1, wherein the first plurality of user selectable scrolling zones are positioned directly adjacent to one another and spread across substantially an entire width of the display screen.

13. The method of claim 1, wherein the first plurality of user selectable scrolling zones are spaced apart from each other and spread across substantially an entire width of the display screen.

14. The method of claim 1, and further comprising, providing a third plurality of user selectable scrolling zones on the display screen, each scrolling zone in the third plurality of scrolling zones associated with a scrolling technique and corresponding to scrolling in a direction that is different from the first and the second directions, and wherein the first, the second, and the third plurality of user selectable scrolling zones collectively include nine scrolling zones organized into three columns and three rows.

15. The method of claim 14, and further comprising:
   sensing a current position of the screen pointer;
   identifying a scrolling zone that is positioned near the current position of the screen pointer; and
   automatically positioning the screen pointer over the identified scrolling zone.

16. The method of claim 1, and further comprising:
   providing at least one user selectable action zone on the display screen, the at least one action zone associated with a display modifying action.

17. The method of claim 16, and further comprising:
   varying the display modifying action associated with the at least one action zone based upon the content currently displayed on the display screen.

18. An electronic device comprising:
   a display screen for displaying information, the display screen including a screen pointer controllable by a user with a screen pointing device, the display screen including a first plurality of user selectable scrolling zones, each user selectable scrolling zone in the first plurality of scrolling zones associated with a scrolling technique that is different than scrolling techniques associated with the other scrolling zones in the first plurality, having a user selectable area defined by hidden boundaries, and corresponding to scrolling in a first direction; and a controller for receiving zone selection information identifying a first one of the scrolling zones selected by a user with the screen pointing device, the controller configured to cause information displayed on the display screen to scroll based on the scrolling technique associated with the selected scrolling zone.

19. The device of claim 18, wherein each scrolling technique corresponds to a scrolling speed.

20. The device of claim 18, wherein each scrolling technique corresponds to a scrolling granularity.

21. The device of claim 20, wherein the scrolling granularities include line scrolling, paragraph scrolling, and page scrolling.

22. A method of scrolling through information displayed on a display screen of an electronic device, the display screen including a screen pointer controllable by a user with a screen pointing device, the method comprising:

receiving mode selection information from a user, the mode selection information indicating that a user has selected a scroll mode;

receiving movement information provided by a user with the screen pointing device;

determining a first movement direction and a first movement velocity based on the received movement information;

moving the screen pointer based on the received movement information; and scrolling the displayed information on the display screen in a direction corresponding to the first movement direction and in an amount based on the first movement velocity, the scrolling amount greater than the amount of movement of the screen pointer.

23. The method of claim 1, wherein at least one of the scrolling zones is defined by hidden boundaries that are invisible to a user of the electronic device.

* * * * *

UNITED STATES PATENT AND TRADEMARK OFFICE
CERTIFICATE OF CORRECTION

PATENT NO. : 6,972,776 B2  Page 1 of 1
APPLICATION NO. : 09/812754
DATED : December 6, 2005
INVENTOR(S) : Jeffery Davis It is certified that error appears in the above-identified patent and that said Letters Patent is hereby corrected as shown below:

Col. 9 Line 58 In Claim 3, delete "granulanties." and insert -- granularities. --, therefor.

Col. 10 Line 46 In Claim 15, delete "14," and insert -- 13, --, therefor.

Signed and Sealed this

Third Day of March, 2009

JOHN DOLL
*Acting Director of the United States Patent and Trademark Office*